United States Patent
Nazarov et al.

(10) Patent No.: US 7,246,605 B2
(45) Date of Patent: Jul. 24, 2007

(54) METHOD AND SYSTEM FOR CONTROLLING FUEL INJECTION TIMING TO MAINTAIN DESIRED PEAK CYLINDER PRESSURE FOR HIGH ALTITUDE OPERATION

(75) Inventors: Alexander Nazarov, Zionsville, IN (US); Rex E. Ralston, Indianapolis, IN (US); David J. Reynolds, Memphis, IN (US)

(73) Assignee: Cummins, Inc., Columbus, IN (US)

( * ) Notice: Subject to any disclaimer, the term of this patent is extended or adjusted under 35 U.S.C. 154(b) by 49 days.

(21) Appl. No.: 11/137,881

(22) Filed: May 26, 2005

(65) Prior Publication Data

US 2006/0266336 A1    Nov. 30, 2006

(51) Int. Cl.
*F02M 7/00*    (2006.01)
(52) U.S. Cl. ...................................... 123/501; 123/435
(58) Field of Classification Search ............. 123/501, 123/380, 383; 701/105
See application file for complete search history.

(56) References Cited

U.S. PATENT DOCUMENTS 6,286,480 B1 * 9/2001 Chen et al. ................. 123/501
6,814,060 B1 * 11/2004 Solomons et al. .......... 123/501
7,055,504 B1 * 6/2006 Gallagher et al. .......... 123/501
2003/0056751 A1 * 3/2003 Sukegawa et al. ......... 123/501

* cited by examiner

*Primary Examiner*—Stephen K. Cronin
*Assistant Examiner*—Arnold Castro
(74) *Attorney, Agent, or Firm*—Baker & Daniels LLP

(57) ABSTRACT

An algorithm for use in an engine control module to control peak cylinder pressure in a diesel engine under high altitude operating conditions, including an initiation and entering routine configured to determine whether conditions are met for advancing a start of injection time used by the engine control module to cause an injection of fuel into a cylinder of the engine, an increment routine that is executed by the engine control module when the initiation and entering routine determines that the conditions are met to advance the start of injection time using a first increment when the first increment is less than or equal to an increment step and less than or equal to a second increment, and advance the start of injection time using the second increment when the first increment is greater than one of the increment step and the second increment, and an exiting routine that is executed by the engine control module when the initiation and entering routine determines that the conditions are not met to decrement the start of injection time when the first increment is less than or equal to a decrement step.

24 Claims, 4 Drawing Sheets

METHOD AND SYSTEM FOR CONTROLLING FUEL INJECTION TIMING TO MAINTAIN DESIRED PEAK CYLINDER PRESSURE FOR HIGH ALTITUDE OPERATION

FIELD OF THE INVENTION

The present invention generally relates to diesel engines and more particularly to diesel engine fuel injection timing algorithms for maintaining the desired peak cylinder pressure during high altitude operation.

BACKGROUND OF THE INVENTION

Diesel engines include cylinders that combust a mixture of compressed, high temperature air and diesel fuel. The liquid fuel is injected into the cylinder, where it breaks into tiny particles and mixes with the air to form a combustible mixture. Several variables affect the completeness and efficiency of combustion, including the air-to-fuel ratio of the mixture, which is affected by the timing of the fuel injection.

Typically, fuel injection timing for diesel engines is set such that the cylinder firing pressure remains below a maximum value under normal operating conditions. As such, the fuel injection timing is based in part on atmospheric pressure at approximately sea level. When the engine operates at high altitudes (low atmospheric pressures), reduced quantities of air are provided to the cylinders, which causes incomplete and inefficient combustion, and reduced peak cylinder pressure. This results in lower fuel efficiency, degraded power cylinder life and increased quantities of harmful exhaust emissions.

Moreover, when the engine is coupled to a turbocharger, the higher temperature exhaust gases produced under these conditions, in conjunction with the lower atmospheric pressure, cause the turbocharger to operate at higher speeds. Consequently, power deration may be required to prevent damage to the turbocharger as a result of excessive temperature and/or speed.

SUMMARY OF THE INVENTION

The present invention provides an algorithm for controlling peak cylinder pressure in a diesel engine under high altitude operating conditions by adjusting the fuel injection timing. In one embodiment, the algorithm includes an initiation and entering routine configured to determine whether conditions are met for advancing the start of injection time used by an engine control module coupled to the engine to cause an injection of fuel into a cylinder of the engine. The conditions include whether a boost pressure of the engine is within a predefined range, whether a speed of the engine is above a minimum speed, and whether an ambient pressure is below a maximum ambient pressure.

The algorithm further includes an increment routine that is executed by the engine control module when the initiation and entering routine determines that the conditions are met. The increment routine is configured to determine a first increment to a start of injection variable based on the boost pressure and a fuel rate of the engine, and a second increment to the start of injection variable including a predefined increment step, and to advance the start of injection time using the first increment when the first increment is less than or equal to the increment step and less than or equal to the second increment, and advance the start of injection time using the second increment when the first increment is greater than one of the increment step and the second increment.

The algorithm also includes an exiting routine that is executed by the engine control module when the initiation and entering routine determines that the conditions are not met. The exiting routine is configured to decrement the start of injection time when the first increment is less than or equal to a decrement step.

The features and advantages of the present invention described above, as well as additional features and advantages, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
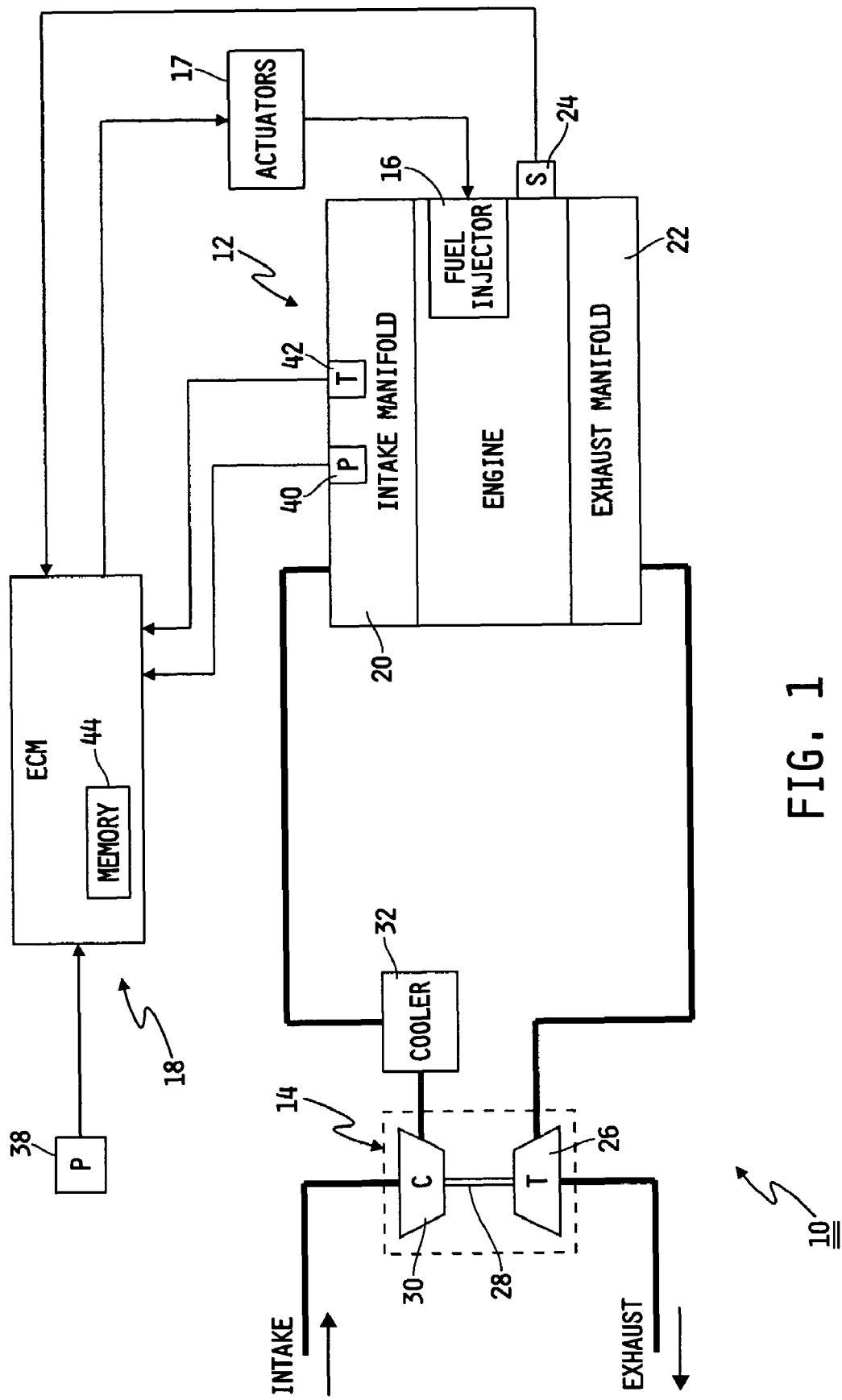
FIG. 1 is a schematic diagram of components of an engine and control system according to one embodiment of the present invention.

Referring now to FIG. 1, system 10 generally includes an engine 12, a turbocharger 14, and an engine control module ("ECM") 18. Engine 12 is an internal combustion engine, and more particularly a diesel engine having a plurality of cylinders (not shown) in which operate a plurality of pistons (not shown) configured to drive a crank shaft (not shown) connected to a power train (not shown). Engine 12 includes a fuel injector 16, an intake manifold 20 and an exhaust manifold 22. Additionally, engine 12 includes a speed sensor 24 configured to sense the rotational speed of engine 12 and provide an electrical signal to ECM 18 indicating the speed of engine 12 (hereinafter, "the speed signal"). It should be understood that speed sensor 24 may be implemented using any of a variety of sensing technologies, including magnetic and optical sensing and the like.

As indicated by the figure, fuel injector 16 is controlled by timing and fueling actuators 17 to inject fuel into the cylinders of engine 12 for combustion. The injected fuel is mixed with cylinder compressed air provided by intake manifold 20. As is well-known in the art, the fuel is injected into each cylinder at a particular time relative to the time when the piston reaches the top-dead-center ("TDC") position. More specifically, ECM 18 calculates parameters for the fuel injections and commands actuators 17 to cause fuel injector 16 to start the primary fuel injection at a specific time (hereinafter, the start-of-injection or SOI time) relative to the time when the piston reaches the TDC position as is further described below.

Turbocharger 14 is a conventional turbocharger having a turbine 26 with a rotor (not shown) that is driven by the exhaust gases from exhaust manifold 22, which are developed during combustion of fuel in the cylinders of engine 12. The exhaust gases are then discharged from turbine 26 to the atmosphere. Turbine 26 is connected by a shaft 28 to a compressor 30, which receives filtered clean air from the atmosphere and delivers high temperature air at an elevated pressure to a cooler 32. Typically, as engine 12 develops more power because of increased speed and/or load, turbine 26 speed increases, as does the temperature of the air delivered by compressor 30. Cooler 32, which may be an air-water heat exchanger, reduces the temperature of the compressed air, and delivers it to intake manifold 20.

System 10 further includes a plurality of sensors in addition to speed sensor 24 including an atmospheric pressure sensor 38, an intake manifold or "boost" pressure sensor 40, and an intake manifold temperature sensor 42. Sensor 38 is configured to provide a signal to ECM 18 that represents the pressure of the operating environment of engine 12 (hereinafter, "the AP signal"). Sensor 40 is coupled to intake manifold 20 and provides a signal to ECM 18 representing the pressure of compressed air provided to engine 12 (hereinafter, "the BP signal"). Sensor 42 is also coupled to intake manifold 20 and provides a signal to ECM 18 representing the temperature of the compressed air provided to engine 12 (hereinafter, the T signal").

As will be further described below, ECM 18 includes, among other things, a memory 44 which stores a variety of data and instructions, including the instructions for executing the algorithm represented by FIGS. 2 through 4, tables of variable relationships used for advancing the SOI time, and default values of certain variables. By executing the algorithm described below, ECM 18 generates an adjusted SOI time which is used to activate fuel injector 16 to compensate for low atmospheric pressure conditions associated with high altitudes.

As indicated above, when engine 12 operates at high altitudes, less air is provided to engine 12. Without advancing to the SOI time, more fuel is required to produce the same power output. Thus, fuel consumption will increase, resulting in less efficient engine operation. Additionally, reduced air flow to engine 12 can result in, among other things, higher exhaust temperatures from exhaust manifold 22 to turbine 26 of turbocharger 14. The higher temperature exhaust and low atmospheric pressure can cause turbocharger 14 to operate at higher speeds, resulting in additional stress on turbocharger 14 and a corresponding reduction in turbocharger life expectancy. Similarly, high temperature operation may reduce the operational life of the power cylinders of engine 12.

Figure 2:
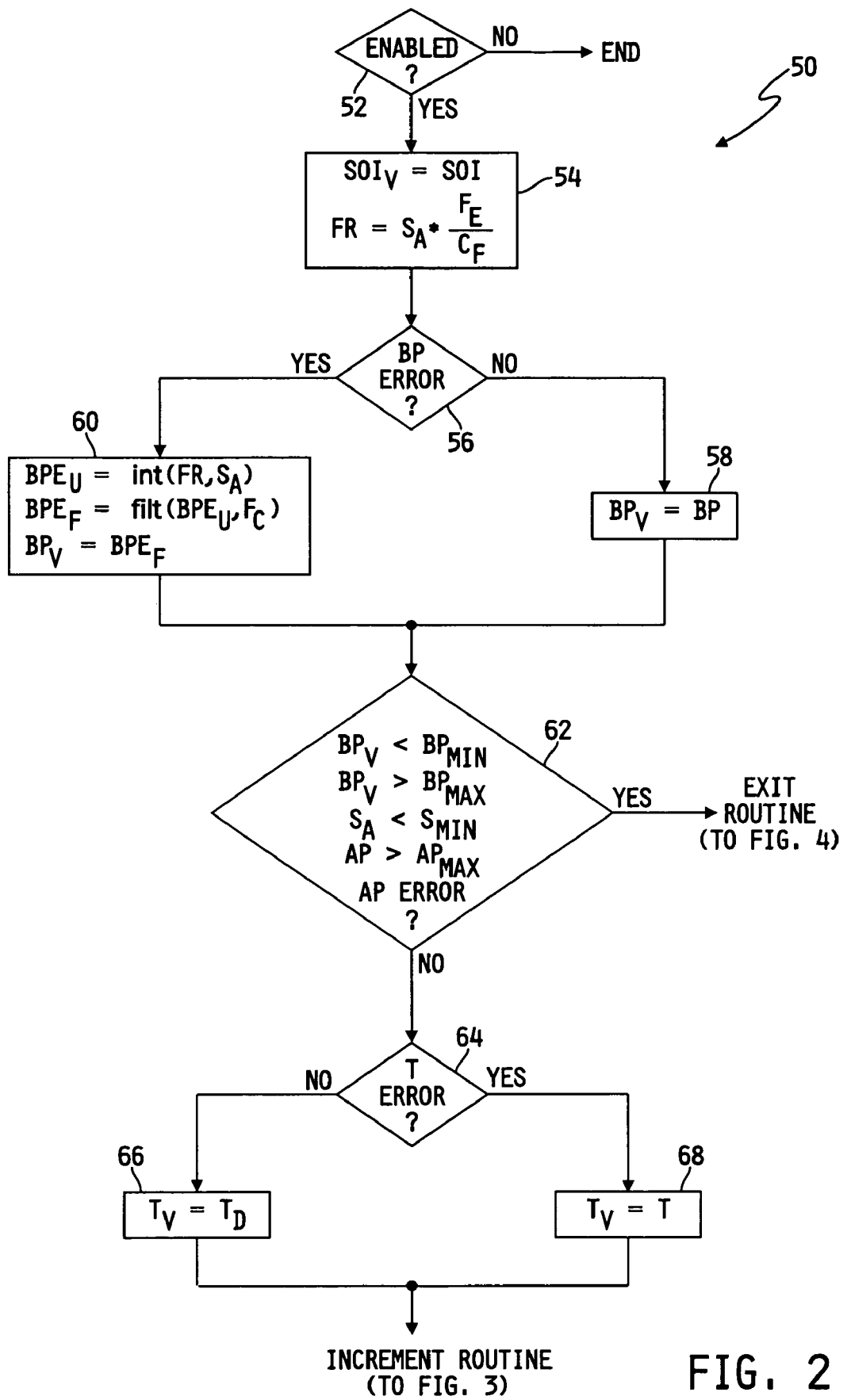
FIG. 2 is a flow diagram of an initiation and entering routine of a fuel injection timing algorithm according to one embodiment of the present invention.

Referring now to FIG. 2, one embodiment of an algorithm 50 according to the present invention begins by requiring ECM 18 to determine whether the algorithm is enabled (block 52). It should be understood that ECM 18 executes a variety of control algorithms during operation of engine 12, and only periodically attempts to execute algorithm 50 (e.g., every 20 ms). If ECM 18 is not currently configured to execute algorithm 50, then at each attempt (i.e., every 20 ms period), the outcome of block 52 is "NO." If algorithm 50 is enabled, then ECM 18 initializes certain variables used by algorithm 50 at block 54.

More specifically, the SOI variable used by algorithm 50 (hereinafter, "$SOI_V$") is initialized to equal the SOI value used globally by other control algorithms executed by ECM 18 (hereinafter, "SOI"). Additionally, the fuel rate variable (hereinafter, "FR") is initialized to equal the currently measured, and appropriately filtered speed of engine 12 as indicated by the speed signal (after filtering) from speed sensor 24 (hereinafter, "$S_A$"), multiplied by the quotient of a fueling estimate value (hereinafter, "$F_E$") and a fuel cylinder factor (hereinafter, "$C_F$"). $F_E$ is a value stored in memory 44 corresponding to a currently estimated amount of fuel as calculated by ECM 18 to be delivered per injection. $C_F$ is a performance characteristic that is specific to engine 12 and is based on the number and size of the cylinders in engine 12. More particularly, $$CF = \text{fuel density} \left(\frac{\text{lbs}}{\text{ft}^3}\right) * \text{conversion constant} * \text{number of cylinders}.$$

The conversion constant is $$3.5315e^{-8}\left(\frac{\text{ft}^3}{\text{mm}^3}\right) * \left(\frac{60 \text{ min.}}{\text{hr.}}\right) \div 2$$

for a four stroke engine. Fuel density is approximately $$52.345\left(\frac{\text{lbs}}{\text{ft}^3}\right)$$

at temperatures of between 100° F. and 107° F. Thus, for US fuel, $$CF = \frac{18,175}{\text{Number of cylinders}}.$$

After $SOI_V$ and FR are initialized, ECM 18 determines at block 56 whether an error in the operation of boost pressure sensor 40 has previously been identified. Such an error may be indicated by a clearly erroneous BP signal from sensor 40 caused by a faulty sensing element, a short circuit, an open circuit, and the like. If the BP signal indicates an error (either high or low), then the boost pressure at intake manifold 20 is estimated in block 60 as explained below. Otherwise, the boost pressure variable used by algorithm 50 (hereinafter, "$BP_V$") is set at block 58 to the global, currently measured and appropriately filtered boost pressure as indicated by the BP signal (hereinafter, "BP").

If ECM 18 identifies an error at block 56, then ECM 18 calculates an unfiltered boost pressure estimate value (hereinafter, "$BPE_U$") at block 60 by accessing data in memory 44 representing estimated boost pressure as a function of FR and $S_A$. More specifically, ECM 18 interpolates a $BPE_U$ value from a three-dimensional table stored in memory 44 wherein $S_A$ is one axis, FR is another axis, and $BPE_U$ is the output or third axis. Next, ECM 18 calculates a filtered value of the estimated boost pressure (hereinafter, "$BPE_F$") by applying a first order lag filter function to $BPE_U$ with a filter constant (hereinafter, "$F_C$"). This filter function is configured to remove or filter out inaccuracies in the boost pressure estimation resulting from rapidly changing values for FR and/or $S_A$, which are used to determine $BPE_U$ as described above. $F_C$ relates to the sampling rate of FR and $S_A$. Finally, ECM 18 sets $BP_V$ to equal $BPE_F$.

Regardless of whether BPv is estimated in block 60 or set equal to the actual boost pressure in block 58, ECM 18 next compares $BP_V$ to minimum and maximum values (hereinafter, $BP_{MIN}$ and $BP_{MAX}$, respectively) in block 62. Additionally, ECM 18 compares $S_A$ to a minimum value (hereinafter, "$S_{MIN}$"), and atmospheric pressure as indicated by the AP signal from sensor 38 (hereinafter, "AP") to a maximum valve (hereinafter, "$AP_{MAX}$"). Finally, ECM 18 also determines whether sensor 38 is reporting erroneous values. Generally speaking, at block 62 ECM 18 determines whether the current operating conditions indicate that adjustments to $SOI_V$ are needed to improve the performance of engine 12 at high altitudes. More specifically, if $BP_V$ is either above or below the range specified by $BP_{MIN}$ and $BP_{MAX}$, or $S_A$ is less than $S_{MIN}$, or AP is greater than $AP_{MAX}$, or the AP signal indicates an error (either high or low), then ECM 18 initiates the exiting routine of FIG. 4. It should be understood that algorithm 50 is designed to improve the performance of engine 12 only when $BP_V$ is within the specific range as defined by $BP_{MIN}$ and $BP_{MAX}$, when engine 12 is operating at a sufficiently high speed (i.e., above $S_{MIN}$), and when a properly functioning atmospheric pressure sensor 38 indicates operation at a sufficiently high altitude (i.e., when atmospheric pressure is less than $AP_{MAX}$).

Figure 3:
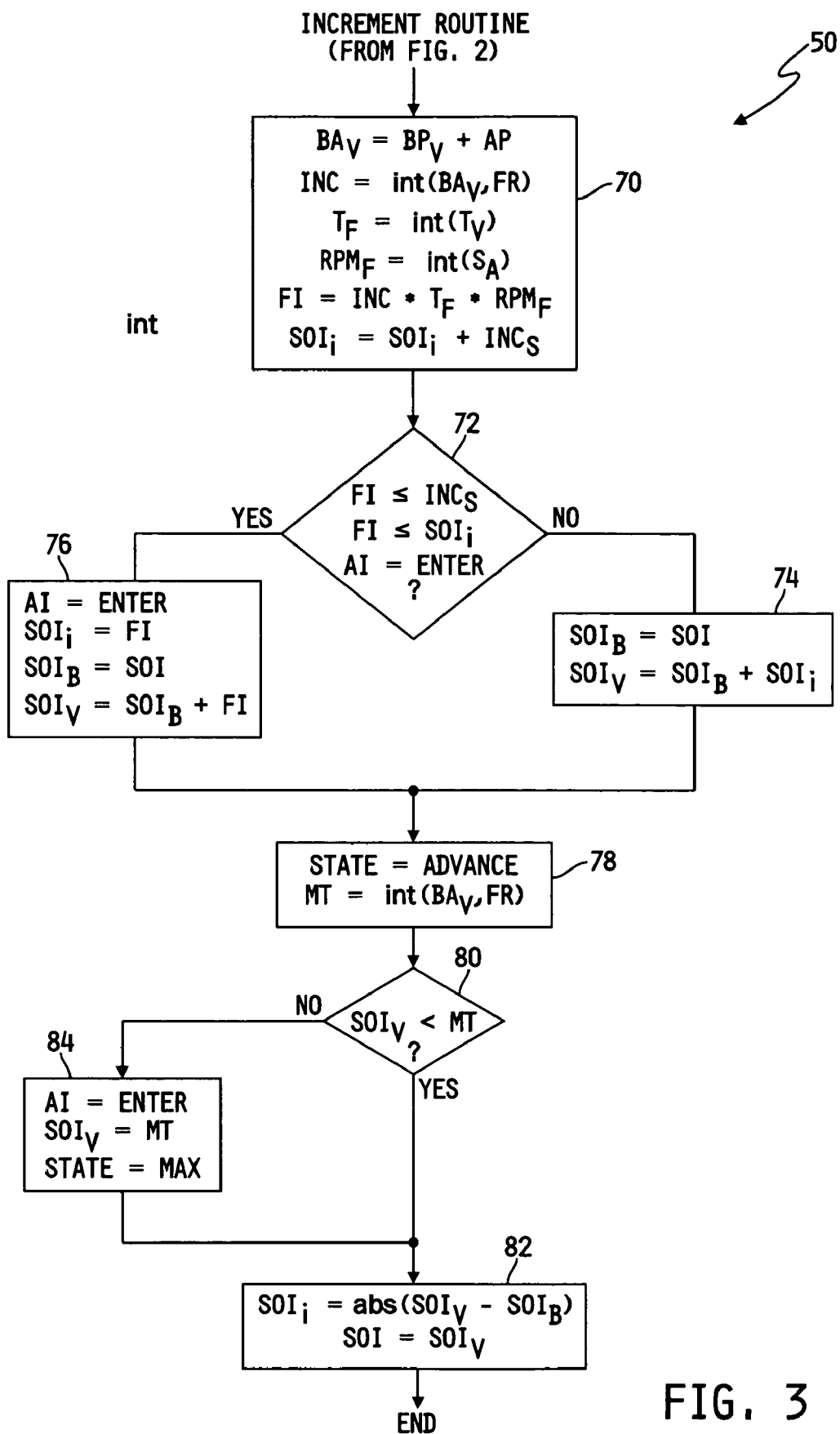
FIG. 3 is a flow diagram of an increment routine of a fuel injection timing algorithm according to one embodiment of the present invention.

If all of the conditions for executing the increment routine of FIG. 3 are met, then ECM 18 determines at block 64 whether temperature sensor 42 has malfunctioned based on the T signal from sensor 42. If sensor 42 indicates the presence of an error (high or low), then at block 66 ECM 18 sets the intake manifold temperature value for use by algorithm 50 (hereinafter, "$T_V$") to a default temperature value (hereinafter, "$T_D$") which is based on performance characteristics of engine 12 and stored in memory 44. Otherwise, at block 68 ECM 18 sets $T_V$ to equal the actual measured temperature as indicated by the appropriately filtered T signal from temperature sensor 42 (hereinafter, "T"). Next, ECM 18 executes the increment routine depicted in FIG. 3.

Referring now to FIG. 3, at block 70 ECM 18 determines a number of values for use in determining an incremental adjustment to the fuel injection timing used by system 10. More specifically, ECM 18 first calculates an absolute boost pressure for use by algorithm 50 (hereinafter, "$BA_V$") by adding $BP_V$ (a gauge pressure measurement) and AP. Next, ECM 18 accesses memory 44 to interpolate an unadjusted increment value (hereinafter, "INC") from a three-dimensional table stored in memory 44 having $BA_V$ values as one axis, FR values as another axis, and INC values as the third axis. INC is later used to compute a final increment (hereinafter, "FI") after adjustments are made to account for different cooling systems and cold weather conditions and different speeds. ECM 18 makes a temperature correction to INC by accessing a two-dimensional table stored in memory 44 having $T_V$ on one axis and a temperature multiplication factor (hereinafter, "$T_F$") on the other axis. In one embodiment, $T_F$ is a value between zero and one that is determined through calibration of engine 12 for various values of $T_V$. Similarly, ECM 18 accesses another two-dimensional calibration table store in memory 44 to determine a speed multiplication factor (hereinafter, "$RPM_F$"). This table includes the actual measured, filtered speed as reported by speed sensor 24 (i.e., $S_A$) on one axis and $RPM_F$ on the other axis. It should be understood that engine 12 may operate at speeds of, for example, between 800 RPM and 2100 RPM. However, at block 62 of FIG. 2, algorithm 50 ensures that fuel injection adjustments are not made unless engine 12 is operating at a sufficiently high speed to require such adjustments (i.e., when $S_A$ is not less than the minimum speed threshold, $S_{MIN}$ of, for example, 1000 RPM). Thus, the $RPM_F$ table provides an $RPM_F$ for engine operation at different speeds between, for example, 1000 RPM and 2100 RPM, each speed having a slightly different effect on fuel injection timing considerations. After the temperature and speed correction factors are determined, ECM 18 calculates FI by multiplying INC by $T_F$ and $RPM_F$. Finally, ECM 18 computes the increment to the SOI time (hereinafter, "$SOI_i$"), which has an initial value of zero, by adding an increment step (hereinafter, "$INC_S$") to $SOI_i$. $INC_S$ is a calibrated parameter specific to engine 12 to ensure that only sufficiently small, incremental changes to the fuel injection timing are made that will not result in unacceptable engine surges or noise.

At block 72, ECM 18 determines whether algorithm 50 will advance the SOI time by using the previously calculated increment FI, or more gradually advance the SOI time by using the smaller increment (i.e., $SOI_i$) determined by $INC_S$. To do this, EMC 18 determines whether FI is less than or equal to $INC_S$ and less than or equal to $SOI_i$, and whether an after increment state of algorithm 50 (hereinafter, "AI") is set to "ENTER" (it is initially set to "EXIT" when ECM 18 begins execution of algorithm 50). If the answer to any of these tests is "NO," then at block 74 ECM 18 initializes a variable representing the SOI time before adjustments (hereinafter, "$SOI_B$") to the global value of SOI, and calculates the new $SOI_V$ by adding $SOI_B$ and $SOI_i$. Alternatively, if the answer to any one of the tests of block 72 is "YES," then at block 76 ECM 18 sets AI to "ENTER," sets $SOI_i$ equal to the previously computed value for FI as the value of FI was determined at block 72 to be smaller than (or at most equal to) the computed value for $SOI_i$, sets $SOI_B$ equal to SOI as explained above with reference to block 74, and computes $SOI_V$ as the sum of $SOI_B$ and FI.

Next, at block 78 ECM 18 sets a state variable (hereinafter, "STATE") that indicates whether algorithm 50 is advancing the SOI time for engine 12 (i.e., incrementing SOI), not advancing the SOI time (i.e., maintaining the SOI computed by ECM 18 prior to execution of this interval of algorithm 50), or has reached the maximum allowable SOI time, as is further described below. At block 78, ECM 18 sets STATE equal to "ADVANCE" as algorithm 50 is in the process of advancing SOI time. Also, ECM 18 accesses a three-dimensional table stored in memory 44 to determine a maximum time adjustment to the fuel injection timing under the particular pressure and fuel rate conditions (hereinafter, "MT"). More specifically, one axis of the three-dimensional table is $BA_V$ as computed in block 70, another axis is FR as computed in block 54 of FIG. 2, and the third axis is MT. Then, at block 80 ECM 18 compares $SOI_V$ to MT. If $SOI_V$ is less than MT (i.e., the computed timing adjustment to the fuel injection timing has not exceeded the maximum allowable adjustment), then at block 82 ECM 18 determines the next increment to the SOI time (i.e., $SOI_i$) by computing the absolute value of the difference between $SOI_V$ and $SOI_B$, and sets the global SOI to the adjusted value of $SOI_V$ as computed in one of blocks 74, 76, or 84. Then, ECM 18 waits for the next opportunity to execute algorithm 50 (i.e., 20 ms later), and returns to block 52 of FIG. 2.

If, on the other hand, $SOI_V$ is not less than the maximum time adjustment, MT, then at block 84 ECM 18 sets AI to "ENTER," sets $SOI_V$ equal to MT, and sets STATE to "MAX" to indicate to algorithm 50 that $SOI_V$ has reached the maximum allowable value. Then, ECM 18 determines $SOI_i$ and sets SOI equal to $SOI_V$ at block 82 as described above. At this point, one iteration of the increment routine is complete. The value for SOI is stored in memory 44 and used by ECM 18 during the next period of operation (i.e., 20 ms) to control the fuel injection timing of fuel injector 16. The value of the increment to SOI (i.e., $SOI_i$) is also stored for use during the next iteration.

At the beginning of the next period, ECM 18 will again determine if the existing pressure and speed conditions still indicate that adjustments to the fuel injection timing may be desirable. At block 52, ECM 18 again determines whether algorithm 50 is enabled. If it is, at block 54 ECM 18 sets $SOI_p$ equal to SOI, which was previously set to equal $SOI_V$ during the last iteration. ECM 18 also recalculates the fuel rate, FR, which may have changed since the previous calculation due to changes in the speed, $S_A$, of engine 12. Next, ECM 18 determines at block 56 whether boost pressure sensor 40 has malfunctioned. If it has, ECM 18 estimates the current boost pressure at block 60 as described above. If not, the boost pressure variable used by algorithm 50, $BP_V$, is set equal to the measured boost pressure, BP, at block 58. Next, ECM 18 determines at block 62 whether $BP_V$ is within the range specified for adjustments to fuel injection timing, whether the speed of engine 12, $S_A$, is sufficiently high to increment the timing, and whether ambient pressure sensor 38 is operating properly and indicates an ambient pressure sufficiently low to increment the SOI time. If all of these conditions are still met, ECM 18 checks for errors in intake manifold temperature sensor 42 (block 64), and uses either a default intake manifold temperature (block 66) or the measured intake manifold temperature (block 64 before entering the increment routine of FIG. 3. If one or more of the conditions of block 62 are not met, ECM 18 executes the exiting routine of FIG. 4 as is further described below.

Assuming the fuel injection timing adjustment conditions are still present, at block 70 ECM 18 again calculates the final increment variable, FI, which is based on the current boost pressure, fuel rate, intake manifold temperature and engine speed, and sets the increment to SOI (i.e., $SOI_i$) equal to the sum of its previous value and the predetermined increment to the increment, $INC_S$, as described above. Next, at block 72 ECM 18 determines whether the newly calculated FI value exceeds either the increment, $SOI_i$, or the increment step, $INC_S$, and whether the after increment state, AI, equals "ENTER." It should be noted that AI may have been set to "EXIT" during operation of the exit routine as is described below. IF FI does not exceed $INC_S$ or $SOI_i$, or if AI does not equal "ENTER", then ECM 18 at block 74 calculates a new $SOI_V$ value as the sum of the SOI value of the previous iteration, which in this example was set to equal the previously calculated $SOI_V$ at block 82, and the increment to SOI (i.e., $SOI_i$) previously calculated at block 82. If, on the other hand, one of the conditions of block 72 is true, then at block 76 AI is set to "ENTER" if not already at that state, and ECM 18 calculates a new $SOI_V$ using FI instead of $SOI_i$ as described above.

At block 78, ECM 18 again sets the variable STATE to "ADVANCE" (it may have been previously set to "STOP" in the exiting routine of FIG. 4 as is described below), and calculates a new maximum timing adjustment value, MT, using the newly calculated boost pressure and fuel rate values. At block 80, ECM 18 checks whether the newly calculated $SOI_V$ is less than the newly calculated MT. If not, then at block 84 ECM 18 sets AI to "ENTER," STATE to "MAX," and $SOI_V$ equal to the newly calculated MT. In other words, if $SOI_V$ is greater than MT, then ECM 18 limits $SOI_V$ to MT. If $SOI_V$ is less than MT, then at block 82 ECM 18 calculates a new increment value, $SOI_i$, as the absolute value of the difference between the newly calculated $SOI_V$ and the SOI value used in the prior iteration (i.e., $SOI_B$ which was set to SOI in one of block 74, block 76, or block 84). This $SOI_i$ value is stored in memory 44 for use during the next iteration. Also at block 82, ECM 18 sets SOI equal to the newly calculated $SOI_V$ to further advance the timing of fuel injector 16 during the next period of operation. This cycle of advancing the fuel injection timing continues until one of the conditions of decision block 62 of FIG. 2 is true, whereupon ECM 18 executes the exiting routine of algorithm 50 as is described below.

Figure 4:
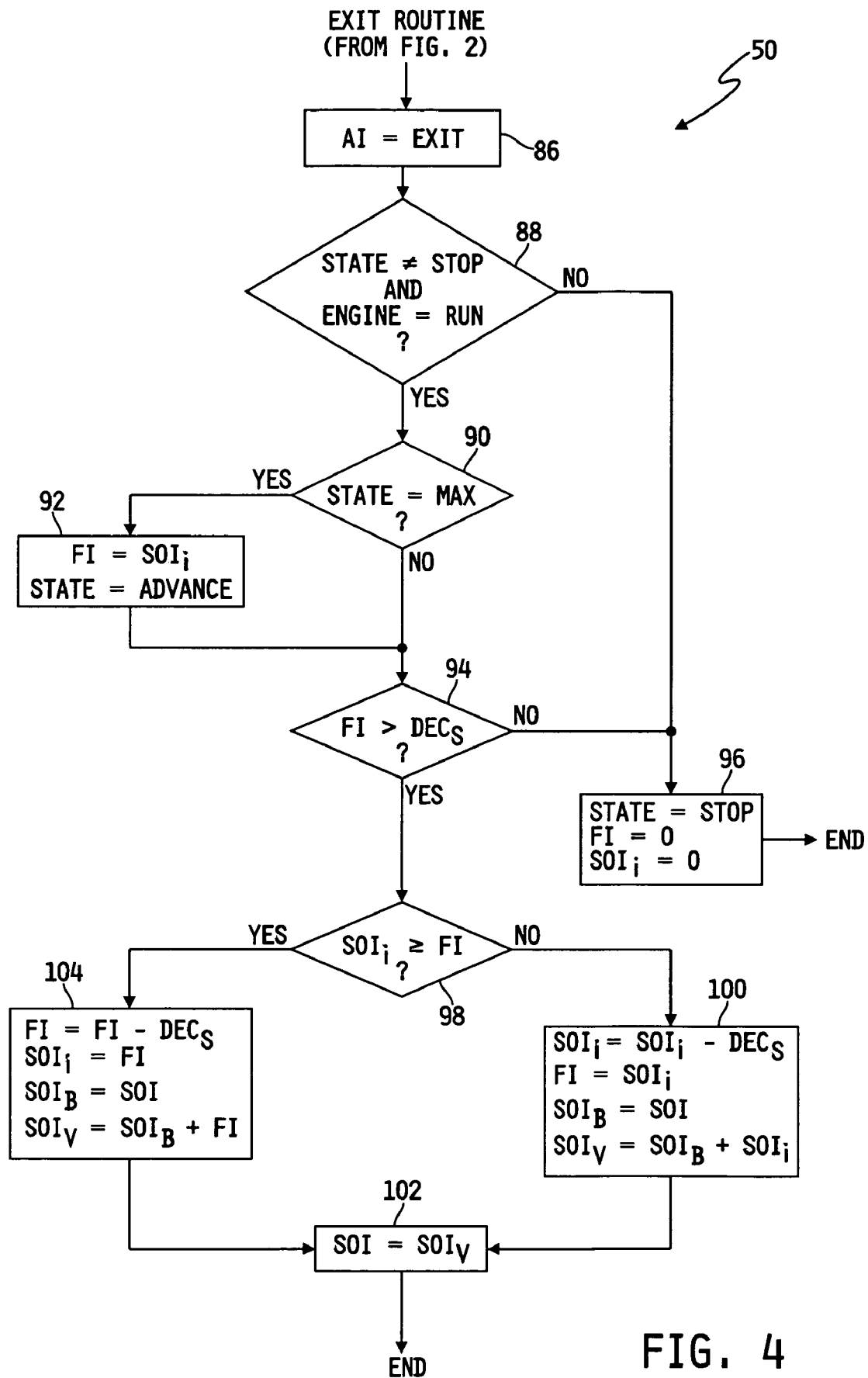
FIG. 4 is a flow diagram of an exiting routine of a fuel injection timing algorithm according to one embodiment of the present invention.

Referring now to FIG. 4, the exiting routine of algorithm 50 commences at block 86 where ECM 18 sets AI to "EXIT" to indicate during the next execution of the increment routine of FIG. 3 that the exit routine had been executed. At block 88, ECM 18 checks whether the variable STATE does not equal "STOP" (i.e., whether STATE equals "ADVANCE" or "MAX"), and whether a state variable indicating the current mode of operation of engine 12 (hereinafter, "ENGINE") equals "RUN." ENGINE may have a plurality of states in addition to "RUN" such as "CRANK," "BREAK," "JUMP," "OVERSPEED," and "SHUTDOWN," all of which indicate operating conditions wherein adjustments to the fuel injection timing are either unnecessary or undesirable. If either of the conditions of block 88 is false (i.e., STATE equals "ADVANCE" or "MAX," or ENGINE equals any state other than "RUN"), then at block 96 ECM 18 sets STATE to "STOP" and resets FI and $SOI_i$ to zero. ECM 18 thus makes no change to the fuel injection timing during the subsequent period, and algorithm 50 returns to block 52 of FIG. 2 at the end of the subsequent period of operation.

If both conditions of block 88 are true, then ECM 18 checks at block 90 whether STATE equals "MAX." STATE can only equal "MAX" if, at block 80 of the increment routine of FIG. 3, ECM 18 determined that $SOI_V$ had met or exceeded the maximum allowable advance of fuel injection timing (i.e., MT). Thus, to avoid sudden changes in the operation of engine 12 that may result from large increments to the fuel injection timing during the exit routine, at block 92 ECM 18 sets FI equal to $SOI_i$. It should be understood that FI may be relatively large compared to $SOI_i$, and, if FI is used in the calculations for decrementing $SOI_V$ (described below), then the relatively large FI value may cause undesirable jumps in the operation of engine 12. $SOI_i$, on the other hand, will always equal the absolute value of the difference between the previous two calculations of $SOI_V$, which as a result of the gradual increments to $SOI_V$ resulting from the increment routine of FIG. 3, will always be a relatively small value. Also at block 92, ECM 18 sets STATE equal to "ADVANCE" to avoid block 92 during the next iteration of the exiting routine of FIG. 4.

After this, or if STATE does not equal "MAX" at block 90, ECM 18 compares FI to a calibrated fuel injection timing decrement value (hereinafter, "$DEC_S$"). If FI is not greater than $DEC_S$, a value selected to result in small changes to the fuel injection timing, then algorithm 50 exits the exiting routine at block 96 as described above because no further decrements to $SOI_V$ are needed. If FI is greater than $DEC_S$, then at block 98 ECM 18 compares $SOI_i$ to FI. If $SOI_i$ is greater than or equal to FI, then ECM 18 decrements $SOI_V$ using FI at block 104. Otherwise, ECM 18 decrements $SOI_V$ using $SOI_i$ at block 100. At block 104, ECM 18 calculates a decremented FI by subtracting $DEC_S$ from the current value of FI. Next, ECM 18 sets $SOI_i$ equal to the new FI, and $SOI_B$ equal to the previously calculated SOI. Finally, ECM 18 calculates a new value for $SOI_V$ as the sum of $SOI_B$ and FI. If ECM 18 instead executes the instructions of block 100, then ECM 18 first decrements $SOI_i$ by subtracting $DEC_S$ from the current value for $SOI_i$, then sets FI equal to the new $SOI_i$. Next, ECM 18 sets $SOI_B$ equal to the previously calculated SOI, and calculates a new value for $SOI_V$ as the sum of $SOI_B$ and $SOI_i$. After either of blocks 100 or 104, at block 102 ECM 18 sets SOI equal to the newly calculated value of $SOI_V$. ECM 18 then exits the exiting routine of algorithm 50 and uses this SOI during the next period of operation.

As should be understood from the foregoing, if, after the next period of operation, ECM 18 determines that the conditions for incrementing the fuel injection timing are still not present (block 62 of FIG. 2), then ECM 18 again executes the exiting routine of FIG. 4. This execution of the exiting routine again sets AI equal to "EXIT" at block 86. If engine 12 is still in RUN mode, then the outcome of block 88 will be "YES," as STATE could only have been set to "STOP" if the exiting routine was exited at block 96 without decrementing SOI, which we have assumed is not the case. As we have assumed STATE does not equal "MAX" (block 90), then ECM 18 next compares FI to $DEC_S$ as described above. Assuming FI is still sufficiently large to require further decrements to SOI (block 94), at block 98 ECM 18 will again determine which of $SOI_i$ and FI is larger. As we are assuming two successive decrements to SOI, during the last execution of the exiting routine, $SOI_i$ and FI were set equal to one another, either at block 104 or block 100. Thus, the outcome of block 98 during this iteration is "YES," as $SOI_j$ equals FI. This will occur for all sequential executions of the exiting routine of FIG. 4, assuming no intervening executions of the increment routine of FIG. 3. Accordingly, at block 104 ECM 18 again decrements FI and uses it to compute a new $SOI_V$. It should be understood that $SOI_V$ gets increasingly smaller, as does SOI since SOI is set to equal $SOI_V$ (block 102) at the end of each iteration of the exiting routine. It should also be noted that as FI always must be greater than DECs (block 94) to decrement farther, the outcome of FI=FI−DECs in block 104 will always be smaller than the previous FI value. Thus, repeated execution of the exiting routine of FIG. 4 will gradually reduce $SOI_v$ using the equation $SOI_v=SOI_B+FI$ (block 104), since $SOI_B$ will have been set equal to the SOI used in the previous iteration. This exiting process continues until one of the following occurs: (1) the operating conditions indicate that SOI should be incremented (block 62); (2) the state of ENGINE is changed to a state other than "RUN" (block 88); or (3) FI is reduced to a value that is no longer greater than $DEC_S$ (block 94). When the first event occurs (i.e., all of the conditions of block 62 are met), ECM 18 executes the increment routine of FIG. 3. When either of the later two events occur, ECM 18 simply continues to exit the exiting routine at block 96 without further decrementing SOI.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for controlling peak cylinder pressure in a diesel engine under high altitude operating conditions, including the steps of:
   determining whether operating conditions are met for advancing a start of injection time corresponding to a time of injection of fuel into a cylinder of the engine;
   computing, if the operating conditions are met, a first increment to a start of injection variable and a second increment to the start of injection variable, the second increment including a increment step value;
   incrementing the start of injection variable by the first increment if the first increment is less than or equal to the increment step value and less than or equal to the second increment;
   incrementing the start of injection variable by the second increment if the first increment is greater than one of the increment step value and the second increment;
   setting the start of injection time equal to the incremented start of injection variable; and
   periodically repeating the preceding steps.

2. The method of claim 1 wherein the step of determining whether operating conditions are met includes determining whether a boost pressure value is within a predefined range, determining whether an engine speed value is above a speed minimum value, and determining whether an ambient pressure value is below an ambient pressure maximum value.

3. The method of claim 2 further including the step of estimating the boost pressure value if a measured boost pressure value is erroneous.

4. The method of claim 3 wherein the estimating step includes the steps of determining an unfiltered boost pressure value as a function of an engine speed value and a fuel rate value, and mathematically filtering the unfiltered boost pressure value.

5. The method of claim 1 further including the step of setting a temperature variable equal to a default temperature value if a measured intake manifold temperature value is erroneous and setting the temperature variable equal to the measured intake manifold temperature value if the measured value is not erroneous.

6. The method of claim 5 wherein the step of computing a first increment to the start of injection variable includes the steps of determining an increment as a function of a boost pressure value and an engine fuel rate value, determining a temperature factor as a function of the temperature variable, determining a speed factor as a function of an engine speed value, and multiplying the increment by the temperature factor and the speed factor.

7. The method of claim 1 wherein the step of incrementing the start of injection variable by the first increment includes the step of adding the first increment to a previous value of the start of injection time.

8. The method of claim 7 wherein the step of incrementing the start of injection variable by the second increment includes the step of adding the second increment to the previous value of the start of injection time.

9. The method of claim 2 further including the step of determining a maximum adjustment value to the start of injection time as a function of the boost pressure value and an engine fuel rate.

10. The method of claim 9 wherein the step of setting the start of injection time equal to the incremented start of injection variable includes the preliminary step of setting the incremented start of injection variable equal to the maximum adjustment value if the incremented start of injection variable is greater than or equal to the maximum adjustment value.

11. The method of claim 1 further including the step of setting the second increment equal to an absolute value of a difference between the incremented start of injection variable and a previous value of the start of injection time.

12. The method of claim 2 further including the step of decrementing the start of injection variable if one of the boost pressure value is not within the predefined range, the engine speed is below the speed minimum value, and the ambient pressure value is above the ambient pressure maximum value.

13. The method of claim 12 wherein the decrementing step includes the steps of determining that the first increment is greater than a decrement value, decrementing the first increment by subtracting the decrement value from the first increment if the first increment is greater than the second increment, and decrementing the second increment by subtracting the decrement from the second increment if the second increment is greater than or equal to the first increment.

14. The method of claim 13 wherein the decrementing step further includes the steps of setting a decremented start of injection variable equal to the sum of a previous value of the start of injection time and the decremented first increment if the first increment is greater than the second increment, and setting the decremented start of injection variable equal to the sum of the previous value of the start of injection time and the decremented second increment if the second increment is greater than or equal to the first increment.

15. The method of claim 14 further including the step of setting the start of injection time equal to the decremented start of injection variable.

16. A system for controlling peak cylinder pressure in a diesel engine under high altitude operating conditions, including:
  an engine control module;
  an ambient pressure sensor configured to provide an ambient pressure signal to the engine control module representing an ambient pressure value;
  a boost pressure sensor coupled to an intake manifold of the engine and configured to provide a boost pressure signal to the engine control module representing a pressure value of gas in the intake manifold;
  a speed sensor coupled to the engine and configured to provide a speed signal to the engine control module representing a speed value of the engine; and
  a fuel injector coupled to the engine, the fuel injector periodically injecting fuel into a cylinder of the engine at a start of injection time relative to a time at which a piston in the cylinder reaches a top-dead-center position;
  the engine control module periodically advancing the start of injection time to achieve a desired peak cylinder pressure when the ambient pressure signal indicates that the engine is at a sufficiently high altitude, the boost pressure signal indicates the pressure of the intake manifold gas is within a predefined pressure range, and the speed signal indicates that the engine is operating at a sufficiently high speed.

17. The system of claim 16 wherein the engine control module includes a memory in which is stored a program that the engine control module periodically executes to determine whether and to what extent the start of injection time should be advanced.

18. The system of claim 16 wherein the engine control module advances the start of injection time by determining a first increment to a start of injection variable as a function of the boost pressure signal and a fuel rate of the engine, determining a second increment to the start of injection variable, the second increment including a predefined increment step, incrementing the start of injection variable by the first increment if the first increment is less than or equal to the increment step and less than or equal to the second increment, incrementing the start of injection variable by the second increment if the first increment is greater than one or the increment step value and the second increment, and setting the start of injection time equal to the incremented start of injection variable.

19. The system of claim 18 further including a temperature sensor coupled to the intake manifold and configured to provide a temperature signal to the engine control module representing a temperature value of the gas in the intake manifold, the engine control module adjusting the first increment to compensate for temperature based on the temperature signal, and adjusting the first increment to compensate for speed based on the speed signal.

20. The system of claim 18 wherein the engine control module increments the start of injection variable by the first increment by adding the first increment to a previously determined start of injection time and increments the start of injection variable by the second increment by adding the second increment to the previously determined start of injection time.

21. The system of claim 18 wherein the engine control module sets the incremented start of injection variable equal to a maximum start of injection adjustment based on the boost pressure signal and the fuel rate if the start of injection variable is not less than the maximum start of injection adjustment.

22. The system of claim 18 wherein the engine control module sets the second increment equal to an absolute value of a difference between the incremented start of injection variable and a previously determined start of injection time.

23. The system of claim 16 wherein the engine control module periodically decrements the start of injection time when, after advancing the start of injection time, one of the ambient pressure signal indicates that the engine is no longer at the sufficiently high altitude, the boost pressure signal indicates that the pressure of the intake manifold gas is not within the predefined pressure range, and the speed signal indicates that the engine is no longer operating at the sufficiently high speed.

24. Computer-readable media for use in an engine control module to control peak cylinder pressure in a diesel engine under high altitude operating conditions encoded with instructions, including:
  an initiation and entering routine configured to determine whether conditions are met for advancing a start of injection time used by the engine control module to cause an injection of fuel into a cylinder of the engine, the conditions including whether a boost pressure of the engine is within a predefined range, whether a speed of the engine is above a minimum speed, and whether an ambient pressure is below a maximum ambient pressure;
  an increment routine that is executed by the engine control module when the initiation and entering routine determines that the conditions are met, the increment routine being configured to determine a first increment to a start of injection variable based on the boost pressure and a fuel rate of the engine, and a second increment to the start of injection variable including a predefined increment step, and to advance the start of injection time using the first increment when the first increment is less than or equal to the increment step and less than or equal to the second increment, and advance the start of injection time using the second increment when the first increment is greater than one of the increment step and the second increment; and
  an exiting routine that is executed by the engine control module when the initiation and entering routine determines that the conditions are not met, the exiting routine being configured to decrement the start of injection time when the first increment is less than or equal to a decrement step.

* * * * *